A. S. BURNELL & I. L. LAVENDER.
STEERING DEVICE FOR MOTOR VEHICLES.
APPLICATION FILED SEPT. 17, 1908.

1,144,754.

Patented June 29, 1915.

Inventors:
Arthur S. Burnell &
Ira L. Lavender
By Fred Gerlach
their Attorney.

Witnesses:

UNITED STATES PATENT OFFICE.

ARTHUR S. BURNELL AND IRA L. LAVENDER, OF WEBSTER CITY, IOWA, ASSIGNORS TO QUEEN MANUFACTURING COMPANY, OF WEBSTER CITY, IOWA, A CORPORATION OF IOWA.

STEERING DEVICE FOR MOTOR-VEHICLES.

1,144,754.

Specification of Letters Patent. Patented June 29, 1915.

Application filed September 17, 1908. Serial No. 453,395.

*To all whom it may concern:*

Be it known that we, ARTHUR S. BURNELL and IRA L. LAVENDER, both residents of Webster City, in the county of Hamilton and State of Iowa, have invented certain new and useful Improvements in Steering Devices for Motor-Vehicles, of which the following is a full, clear, and exact description.

The invention relates to steering-mechanism for motor-vehicles.

The invention designs to provide an improved steering-mechanism for motor-vehicles which is easy of manipulation and which will tend to keep the vehicle in a true course.

In motor-vehicles it is now necessary for the driver to constantly control the steering-mechanism and the mechanism for controlling the dirigible wheels and the invention provides a steering-mechanism which will respond to a nicety to the steering wheel, and may be manipulated with little effort and will inherently tend to keep the vehicle in a true course while it is being propelled, thus making it possible for the driver to be relieved of the necessity of holding the steering-wheel constantly.

Furthermore, the invention designs to provide mechanism which causes the vehicle to turn a corner more smoothly than heretofore.

The invention consists in the several novel features of construction hereinafter set forth and more particularly defined by claim at the conclusion hereof.

Figure 1:
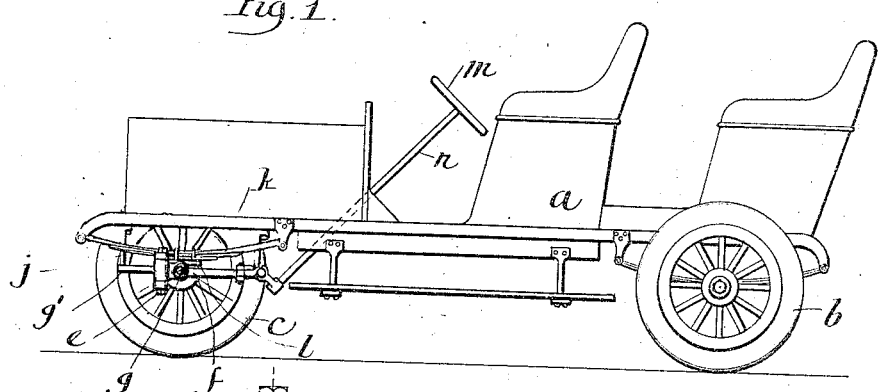
Figure 2:
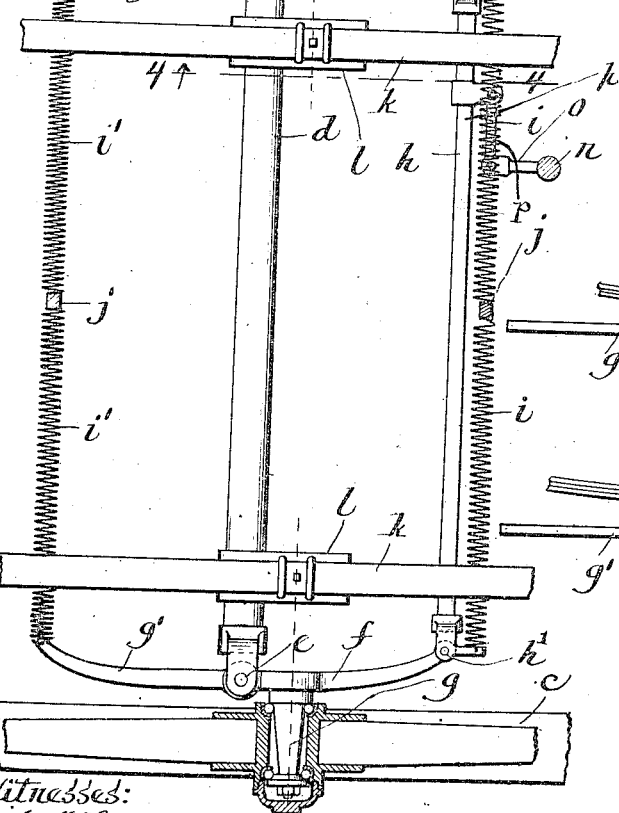
Figure 3:
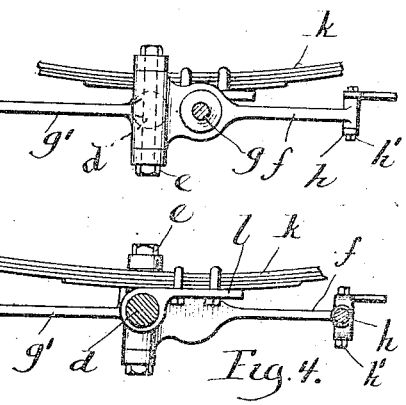
Figure 4:

In the drawings: Figure 1 is a side elevation of a vehicle embodying the invention, parts being shown in section. Fig. 2 is a plan view of the steering-mechanism. Fig. 3 is a side elevation of the arms on which the stud-axles are mounted and the parts connected thereto. Fig. 4 is a section on line 4—4 of Fig. 2.

The motor-vehicle comprises a body $a$, driving-wheels $b$, and front steering-wheels $c$ at the opposite sides of the vehicle respectively, which may be of any suitable construction, as well understood in the art. The front axle $d$ is connected to the body of the vehicle, as hereinafter set forth. To each end of the axle, an arm $f$ is pivoted as at $e$. The ends of the axle $d$ are bifurcated to receive arms $f$. These arms extend rearwardly from the pivots $e$ and each has secured thereto an outwardly extending stub-axle $g$, on which the steering-wheels $c$ are respectively journaled. The rear terminals of the arm $f$ extend inwardly and are cross-connected by a link $h$ which has its ends pivoted as at $h'$ to said arms. Pivots $e$ provide pivotal connections for the stub-axles and the dirigible wheels, which permit the wheels to swing laterally in steering the vehicle. The axes of the stub-axles $g$ and the carrying-wheels mounted thereon, are eccentric with respect to the pivot $e$ between the arms $f$ and the vehicle-axle $d$ and are disposed rearwardly of said pivots. The points of contact between the wheels and the ground are disposed rearwardly and laterally of the pivotal connections for the wheels so that the steering-operation will be more nearly like steering a caster-wheel than if the wheel axis is laterally alined with the pivot of the steering knuckle as usual, therefore it has been found in practice that the entire vehicle may be more easily steered or guided. Furthermore, as the result of this relative disposition of the pivots $e$ and the axes of the wheels, there is greater tendency of the wheels to remain in their course.

To aid the operator in restoring the steering-connections to normal position, and to cause the wheel to travel normally in a straight course, springs $i$ are respectively connected to the ends of arms $f$ and to a stud $j$ secured to the body of the vehicle. These springs serve as means for yieldingly holding the steering-connections in neutral position and for aiding the driver in restoring them to such position.

For the purpose of balancing the spring-pressure on the arms $f$, so that in event the steering-connections becomes defective the stub-axles and wheels will be yieldingly held in neutral position, forwardly extending arms $g'$, rigid with the arms $f$, are respectively connected by springs $i'$ to a stud $j$, depending from the body of the vehicle. Resultantly, this pair of springs also yieldingly holds the steering-connections in neutral position and furthermore, the pressure on the wheel-studs is substantially balanced between the springs $i$ and $i'$, so that if the steering connections become defective, the wheels will be held in neutral position to travel in a straight course.

While in the embodiment of the invention illustrated in the drawings, springs are illustrated for yieldingly holding the wheels in a fore-and-aft line, it will be understood that the springs may be omitted when not desired and that the advantage of the eccentric disposition of the axes of the stub-axles may be attained without the use of said springs.

The axle $d$ is connected to the body of the vehicle by means of springs $k$. These springs are connected to the vehicle-body and are secured to rest on brackets $l$ which are secured to the axle $d$, and extend rearwardly from the axle $d$ so that the weight of the body of the vehicle will be applied rearwardly of the axle to resist the stresses of the stub-axles. Being disposed forwardly of the axes of the stub-axles, the vehicle-axle $d$ is subjected to torsional stresses and to oppose and neutralize these stresses, the springs $k$ are connected to the brackets $l$ so that the weight of the body will be applied rearwardly of the axle and thus apply a counter-force to the axle. That is to say, the stub-axles, being rearwardly of the vehicle-axle, stresses tend to turn the axle forwardly and downwardly and by applying the weight of the vehicle rearwardly of the vehicle-axle $d$, the torsional stresses are opposed and overcome. Link $h$ is connected to a steering-wheel $m$ by shaft $n$, an arm $o$ and a link $p$, as usual in steering-devices of this class.

It will be observed that pivots $h'$ between cross rods $h$ and the steering arms are disposed inwardly of pivots $e$ to cause the wheels to be differentially moved in turning the corner. For example, if rod $h$ is shifted to turn the vehicle to the left, the left-hand wheel will be turned at a slightly greater angle than the outer or right-hand wheel.

In operation, the power applied to the vehicle acting on the cross-connection and arms $f$ tends to keep the vehicle in its course. When the course of the vehicle is to be changed, the operator will turn the steering-wheel $m$ to operate link $h$, which will cause the steering-connections to be operated so that the pivot $e$ at one side will be shifted forwardly and laterally with respect to the point of contact between the wheel and the ground at the same side of the vehicle while the pivot at the other side will be shifted rearwardly and laterally.

In practice it has been found that this construction of steering-device may be more easily operated, and has a tendency to cause the vehicle to remain in its true course. The springs for holding and restoring the steering-connections to normal position make it possible for the driver to easily restore the steering-wheels to normal position.

The invention is not to be understood as restricted to the details set forth, since these may be modified within the scope of the appended claim without departing from the spirit and scope of the invention.

Having thus described the invention, what we claim as new and desire to secure by Letters Patent, is:

In a vehicle, the combination of wheels at opposite sides of the vehicle, an axle connected to the vehicle, provided with terminals adjacent the wheels, a body mounted on said axle so that the weight thereof will be applied rearwardly of the axle, a steering-arm pivoted to each of the axle-terminals in alinement with the axis of the axle, a stub-axle or spindle projecting outwardly from each arm and having its axis rearwardly of, and eccentric with respect to the pivot of the arm to which it is connected and the axis of the axle, said arms having their rear ends extended inwardly of the pivots between the arms and the axle, and a controlling-device mounted on the vehicle for shifting both of said arms to swing the vehicle-wheels.

ARTHUR S. BURNELL.
IRA L. LAVENDER.

Witnesses:
HARRY O. CUTLER,
E. E. MASON.